US010789557B2

(12) United States Patent
Mulla et al.

(10) Patent No.: US 10,789,557 B2
(45) Date of Patent: Sep. 29, 2020

(54) METHOD AND SYSTEM FOR AUTO-ALLOCATION OF TASKS TO RESOURCES OF AN ORGANIZATION

(71) Applicant: Conduent Business Services, LLC, Dallas, TX (US)

(72) Inventors: Ameer Mulla, Kolhapur (IN); Gurulingesh Raravi, Bangalore (IN); Jagadeesh Chandra Bose Rantham Prabhakara, Chittoor (IN); Avantika Gupta, Vrindavan (IN); Koustuv Dasgupta, Bangalore (IN)

(73) Assignee: Conduent Business Services, LLC, Florham Park, NJ (US)

( * ) Notice: Subject to any disclaimer, the term of this patent is extended or adjusted under 35 U.S.C. 154(b) by 754 days.

(21) Appl. No.: 15/228,039

(22) Filed: Aug. 4, 2016

(65) Prior Publication Data
US 2018/0039526 A1 Feb. 8, 2018

(51) Int. Cl.
*G06Q 10/06* (2012.01)

(52) U.S. Cl.
CPC ....... *G06Q 10/06311* (2013.01); *G06Q 10/06* (2013.01); *G06Q 10/0631* (2013.01); *G06Q 10/06312* (2013.01)

(58) Field of Classification Search
CPC ............. G06Q 10/06; G06Q 10/06311; G06Q 10/063112; G06Q 30/01
See application file for complete search history.

(56) References Cited

U.S. PATENT DOCUMENTS

| 5,111,391 | A | 5/1992 | Fields et al. |
| 6,587,851 | B1 | 7/2003 | Ditcharo et al. |
| 7,203,655 | B2* | 4/2007 | Herbert ................. G06Q 10/10 705/7.42 |
| 7,426,267 | B1* | 9/2008 | Caseau ............... H04M 3/5232 379/265.02 |
| 8,239,249 | B1 | 8/2012 | Belko et al. |
| 8,311,863 | B1* | 11/2012 | Kemp ................ G06Q 10/0639 705/7.11 |
| 9,208,465 | B2* | 12/2015 | Grasso ............. G06Q 10/06398 |

(Continued)

OTHER PUBLICATIONS

Avaya P330 Load Balancing Manager User Guide, Mar. 2002, pp. 1-89 (Year: 2002).*

(Continued)

*Primary Examiner* — Jonathan G Sterrett
(74) *Attorney, Agent, or Firm* — Jones Robb, PLLC

(57) ABSTRACT

A method and a system are provided for auto-allocation of one or more tasks to one or more resources of an organization. The method includes receiving one or more requests from a requestor computing device associated with the organization over a communication network. The one or more requests may include at least one or more first attributes of the one or more tasks and one or more pre-defined constraints. The method further includes extracting one or more second attributes associated with the one or more resources based on at least the one or more first attributes of the one or more tasks. The method further includes determining an allocation of the one or more tasks to the one or more resources based on at least the one or more first attributes and the one or more second attributes, such that the one or more predefined constraints are satisfied.

15 Claims, 4 Drawing Sheets

(56) References Cited

U.S. PATENT DOCUMENTS

| | | | |
|---|---|---|---|
| 2002/0065700 | A1 | 5/2002 | Powell et al. |
| 2003/0068427 | A1 | 4/2003 | Wysocki |
| 2004/0068427 | A1 | 4/2004 | Su |
| 2005/0228707 | A1 | 10/2005 | Hendrickson |
| 2007/0064912 | A1* | 3/2007 | Kagan .............. H04M 3/5232 379/265.1 |
| 2008/0043987 | A1* | 2/2008 | Waalkes ............. H04M 3/5166 379/265.11 |
| 2008/0183538 | A1 | 7/2008 | Hamadi et al. |
| 2010/0010859 | A1 | 1/2010 | Ratakonda et al. |
| 2010/0069081 | A1 | 3/2010 | Mitra et al. |
| 2010/0215169 | A1* | 8/2010 | Ristock ............. H04L 41/5061 379/221.15 |
| 2012/0084111 | A1* | 4/2012 | Aggarwal ........ G06Q 10/06311 705/7.14 |
| 2012/0087486 | A1* | 4/2012 | Guerrero ............ H04M 3/5175 379/265.02 |
| 2012/0102043 | A1* | 4/2012 | Verma .................. G06Q 30/02 707/748 |
| 2012/0215578 | A1 | 8/2012 | Swierz, III et al. |
| 2013/0191185 | A1* | 7/2013 | Galvin .................. G06Q 10/10 705/7.37 |
| 2014/0122143 | A1 | 5/2014 | Fletcher et al. |

OTHER PUBLICATIONS

Queueing models of call centers: An introduction G Koole, A Mandelbaum—Annals of Operations Research, 2002—Springer (Year: 2002).*

Cisco Unified Contact Center Express Solution Reference Network Design Cisco Unified Contact Center Express, Release 8.0 May 2012 (Year: 2012).*

"Staff scheduling for inbound call and customer contact centers", A Fukunaga, E Hamilton, J Fama, D Andre, O Matan . . . —Ai Magazine, 2002—wvvw.aaai.org (Year: 2002).*

OM practice—Work expands to fill the time available: Capacity estimation and staffing under Parkinson's law S Hasija, E Pinker, RA Shumsky—Manufacturing & Service . . . , 2010—pubsonline. informs.org (Year: 2010).*

Coping with time-varying demand when setting staffing requirements for a service system LV Green, PJ Kolesar, W Whitt—Production and Operations . . . , 2007—Wiley Online Library (Year: 2007).*

"A stochastic programming model for scheduling call centers with global service level agreements" TR Robbins, TP Harrison—European Journal of Operational Research, 2010—Elsevier (Year: 2010).*

Cross training in call centers with uncertain arrivals and global service level agreements T Robbins, T Harrison—International Journal of Operations and . . . , 2010—myweb.ecu.edu (Year: 2010).*

R.L. Graham, E.L. Lawler, J.K. Lenstra, A.H.G.Rinnooy Kan, Optimization and Approximation in Deterministic Sequencing and Scheduling: a Survey, In: P.L. Hammer, E.L. Johnson and B.H. Korte, Editor(s), Annals of Discrete Mathematics, Elsevier, 1979, vol. 5, pp. 287-326.

Mokotoff, Ethel. Parallel machine scheduling problems: a survey. Asia-Pacific Journal of Operational Research 18.2 (2001): 193.

* cited by examiner

METHOD AND SYSTEM FOR AUTO-ALLOCATION OF TASKS TO RESOURCES OF AN ORGANIZATION

TECHNICAL FIELD

The presently disclosed embodiments are related, in general, to a task allocation system. More particularly, the presently disclosed embodiments are related to method and system for auto-allocation of tasks to resources of an organization.

BACKGROUND

With ever increasing demand of service delivery organizations providing operations support, sales services, and information technology (IT) services, a large volume of transactions are processed every day by one or more resources of organizations. This may further be projected to increase at a rapid rate in coming years. Therefore, it may be imperative that the organizations need to find ways to optimize their operations to meet Service Level Agreements (SLAs) catering to the increasing workload. One of the means to achieve this objective is to explore various ways of increasing a throughput of each of the one or more resources, who may be handling or processing the transactions by use of various computing devices and tools in the organizations. In such a case, task allocation plays a crucial role on the throughput of the one or more resources and on the SLAs (e.g., quality, turnaround time, etc.).

Traditionally, the task allocation in the service delivery organizations may be done manually by an individual, such as a staffing manager or a team lead. The individual may manage a set of resources and may further be responsible for handling the transactions pertaining to one or more processes. For example, for a batch of transactions that are raised, the individual may manually analyze the transactions (type, skills required, etc.), and thereafter, may assign the transactions to the one or more resources that correspond to the set of resources. However, during the assignment or allocation of the transactions, the individual may have to factor in a number of complex aspects, for example, workload of the one or more resources, a complexity of transaction types, skills of the one or more resources, time deadlines by which a transaction may have to be completed, fairness of allocation, and so on. Therefore, such way of allocating transactions to the one or more resources may be often prone to errors and biases. For example, if a right number and right kind of transactions are not assigned to a right set of resources, it may lead to violations in the SLAs of the transactions, deterioration in performance for the resources, resource dissatisfaction, and even loss of customers to such organizations in a few cases. Therefore, there is a need for a method and system that can assign the right number and the right kind of transactions to the appropriate resources of the organizations.

Further, limitations and disadvantages of conventional and traditional approaches will become apparent to one of skill in the art, through comparison of described systems with some aspects of the present disclosure, as set forth in the remainder of the present application and with reference to the drawings.

SUMMARY

According to embodiments illustrated herein, there is provided a method for auto-allocation of tasks to resources by a computing server associated with an organization. The method includes receiving, by one or more transceivers at the computing server, one or more requests pertaining to an allocation of one or more tasks to one or more resources associated with the organization. The one or more requests are received from a requestor computing device associated with the organization over a communication network. The one or more requests include at least one or more first attributes of the one or more tasks and one or more predefined constraints associated with the allocation of the one or more tasks. The one or more first attributes includes at least one or more skills required to process the one or more tasks and one or more service level agreements (SLAs) of the one or more tasks. The one or more predefined constraints are based on at least the one or more SLAs and one or more resource parameters associated with each of the one or more resources. The method further includes extracting, by one or more attribute extracting processors at the computing server, one or more second attributes associated with the one or more resources from a database server over the communication network. The one or more second attributes are extracted based on at least the one or more first attributes of the one or more tasks. The one or more second attributes includes at least the one or more current skills of the one or more resources. The method further includes determining, by the one or more tasks allocating processors at the computing server, the allocation of the one or more tasks to the one or more resources. The allocation is based on at least the one or more first attributes and the one or more second attributes, such that the one or more predefined constraints are satisfied.

According to embodiments illustrated herein, there is provided a system for auto-allocation of tasks to resources by a computing server associated with an organization. The system includes one or more transceivers in the computing server that are configured to receive one or more requests, pertaining to an allocation of one or more tasks to one or more resources associated with the organization. The one or more requests are received from a requestor computing device associated with the organization over a communication network. The one or more requests includes at least one or more first attributes of the one or more tasks and one or predefined constraints associated with the allocation of the one or more tasks. The one or more first attributes includes at least one or more skills required to process the one or more tasks and one or more SLAs of the one or more tasks. The one or more predefined constraints are based on at least the one or more SLAs and one or more resource parameters associated with each of the one or more resources. The system further includes one or more processors that are configured to extract one or more second attributes associated with the one or more resources from a database server over the communication network. The extraction of one or more second attributes are based on at least the one or more first attributes of the one or more tasks. The one or more second attributes includes at least one or more current skills of the one or more resources. The one or more processors are further configured to determine the allocation of the one or more tasks to the one or more resources. The allocation is based on at least the one or more first attributes and the one or more second attributes, such that the one or more predefined constraints are satisfied.

According to embodiment illustrated herein, there is provided a computer program product for use with a computer. The computer program product includes a non-transitory computer readable medium. The non-transitory computer readable medium stores a computer program code for auto-allocation of tasks to resources by a computing server associated with an organization. The computer program code is executable by one or more processors in the computing server to receive one or more requests pertaining to an allocation of one or more tasks to one or more resources associated with the organization. The request for the allocation of the one or more tasks may be received from a requestor computing device associated with the organization over a communication network. The one or more requests includes at least one or more first attributes of the one or more tasks and one or more predefined constraints associated with the allocation of the one or more tasks. The one or more first attributes includes at least one or more skills required to process the one or more tasks and one or more SLAs of the one or more tasks. The one or more predefined constraints are based on at least the one or more SLAs and one or more resource parameters associated with each of the one or more resources. The computer program code is further executable by one or more processors to extract one or more second attributes associated with the one or more resources from a database server over the communication network. The extraction of the one or more second attributes are based on at least the one or more first attributes of the one or more tasks. The one or more second attributes includes at least one or more current skills of the one or more resources. The computer program code is further executable by one or more processors to determine the allocation of the one or more tasks to the one or more resources. The allocation is based on at least the one or more first attributes and the one or more second attributes, such that the one or more predefined constraints are satisfied.

BRIEF DESCRIPTION OF DRAWINGS

The accompanying drawings illustrate the various embodiments of systems, methods, and other aspects of the disclosure. Any person having ordinary skill in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Furthermore, the elements may not be drawn to scale.

Various embodiments will hereinafter be described in accordance with the appended drawings, which are provided to illustrate the scope and not to limit it in any manner, wherein like designations denote similar elements, and in which.

DETAILED DESCRIPTION

Figure 1:
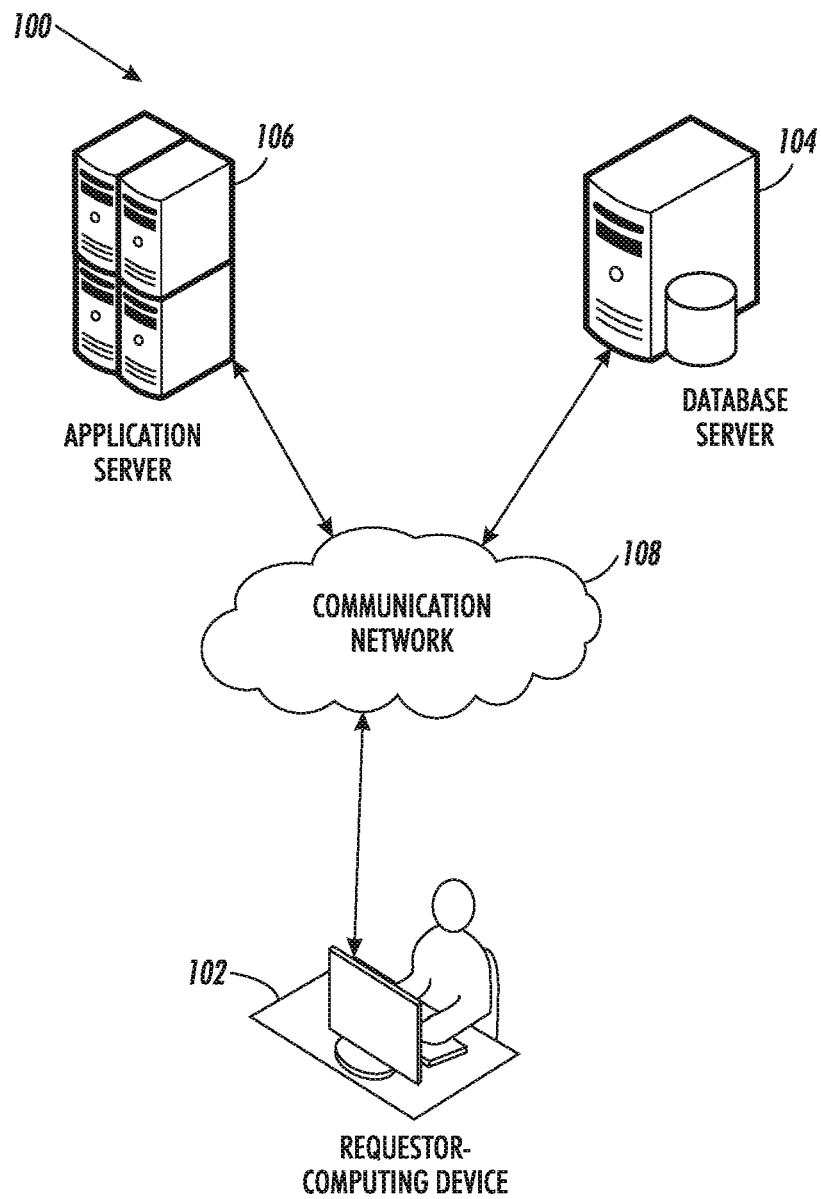
FIG. 1 is a block diagram of a system environment in which various embodiments can be implemented, in accordance with at least one embodiment.

The present disclosure is best understood with reference to the detailed figures and description set forth herein.

Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on, indicate that the embodiment(s) or example(s) may include a particular feature, structure, characteristic, property, element, or limitation, but that not every embodiment or example necessarily includes that particular feature, structure, characteristic, property, element, or limitation. Furthermore, repeated use of the phrase "in an embodiment" does not necessarily refer to the same embodiment.

Definitions: The following terms shall have, for the purposes of this application, the meanings set forth below.

A "computing device" refers to a computer, a device (that includes one or more processors/microcontrollers and/or any other electronic components), or a system (that performs one or more operations according to one or more sets of programming instructions, codes, or algorithms) associated with an individual. For example, an individual may utilize a computing device to transmit one or more requests and associated data to a computing server. In another exemplary scenario, the individual may utilize the computing device to view one or more responses pertaining to the one or more requests. Examples of the computing device may include, but is not limited to, a desktop computer, a laptop, a personal digital assistant (PDA), a mobile device, a smartphone, and a tablet computer (e.g., iPad® and Samsung Galaxy Tab®).

A "task" refers to a piece of work, an activity, an action, a job, an instruction or an assignment to be performed. Tasks may necessitate the involvement of one or more individuals. Examples of tasks include, but are not limited to, digitization of a document, generating a report, evaluating a document, conducting a survey, writing a code, extracting data, and/or translating text. Hereinafter, "task," "project," "assignment," "activity," "job," and/or the like, may be interchangeably used.

"One or more skills" refer to one or more abilities of an individual (e.g., an employee) that may be required to work upon a project. In an embodiment, the skills of the employee may be classified as, but not limited to, managerial skills, engineering skills, and research skills.

A "resource" refers to a worker(s) that may perform one or more tasks, which generate data that contribute to a defined result, for example, proofreading a part of a digital version of an ancient text or analyzing a quantum of a large volume of data. In an embodiment, the resource may be the workers(s) or employee(s) associated with an organization, who possesses one or more skills that may be required to perform the one or more tasks. Hereinafter, "resource," "employee," "worker," "activity," "workforce," and/or the like may be interchangeably used.

An "organization" refers to an entity comprising a group of individuals engaged in a business of developing, enhancing, selling, renting, or sharing one or more products or services to one or more other organizations or individuals. The group of individuals may be associated with one or more computing devices to perform one or more assigned tasks. Further, the group of individuals may utilize the one or more computing devices to communicate with the one or more other organizations or individuals over the communication network. Hereinafter, "entity," "organization," "company," and/or the like may be interchangeably used.

An "allocation" of a task refers to an assignment of the task to one or more employees with desired skill sets, who may be responsible to work upon the task either individually or in a group.

A "request" refers to a message that corresponds to an allocation of one or more tasks to one or more resources associated with an organization. The one or more computing devices in the organization may be utilized to transmit the request to a computing server. Based on the transmitted request, the computing server may initiate the process of allocating the one or more tasks to the one or more resources.

"Service level agreements (SLAs)" refer to terms and conditions that are associated with a task. For example, one or more SLAs may include, but are not limited to, a measure of a cost, an accuracy measure, or a time of completion of a task. In an embodiment, the one or more SLAs may ensure that one or more workers executes the task in a timely, economical, and effective manner, as per the agreed expectations.

"One or more first attributes" refer to a set of configurable or inherent features associated with one or more tasks that are submitted or provided by one or more requestors. In an embodiment, the one or more attributes may comprise significant information with respect to the execution of the one or more tasks by one or more employees. For example, the one or more first attributes of the one or more tasks may comprise one or more of, but are not limited to, a posting time of each of the one or more tasks, an expiry time of each of the one or more tasks, a number of instances or sub-tasks of each of the one or more tasks, a task type associated with each of the one or more tasks, skills required to process each of the one or more tasks, a cost associated with each of the one or more tasks, a count of employees required to process each of the one or more tasks, and a time taken by each resource to process the one or more tasks of each type in the past.

"One or more second attributes" refer to a set of configurable or inherent features associated with one or more resources. For example, the one or more second attributes of a resource may comprise one or more of, but are not limited to, one or more current skills of the resource, a historical performance of the resource, a current allocation of the resource, and a proficiency level of the resource.

"Pre-defined constraints" refer to a set of requirements associated with an allocation of one or more tasks to one or more resources in an organization. In an embodiment, a requestor, such as a staffing manager, may define one or more constraints, and thereafter, may transmit the one or more pre-defined constraints to a computing server. For example, a pre-defined constraint may be defined based on one or more of, but is not limited to, a workload of one or more resources, a utilization of the one or more resources, and a productivity of one or more resources. After receiving the one or more pre-defined constraints from a concerned individual, the computing server may allocate the one or more tasks to the one or more resources, such that at least the one or more pre-defined constraints are satisfied.

A "user interface (UI)" refers to an interface or a platform that may facilitate a user to interact with an associated computing device, such as a computer, a laptop, or smart-phone. The user may utilize various input mediums to interact with the UI such as, but not limited to, a keypad, mouse, joystick, any touch-sensitive medium (e.g., a touch-screen or touch sensitive pad), voice recognition, gestures, video recognition, and so forth. Hereinafter, "user interface (UI)" may be interchangeably used with "graphical user interface (GUI)".

FIG. 1 is a block diagram of a system environment in which various embodiments of a method and a system for allocation of tasks to resources may be implemented. With reference to FIG. 1, there is shown a system environment 100 that includes a requestor-computing device 102, a database server 104, an application server 106, and a communication network 108. The requestor-computing device 102, the database server 104, and the application server 106 are communicatively coupled with each other over the communication network 108. FIG. 1 shows, for simplicity, one requestor-computing device, such as the requestor-computing device 102, one database server, such as the database server 104, and one application server, such as the application server 106. However, it will be apparent to a person having ordinary skill in the art that the disclosed embodiments may also be implemented using multiple requestor-computing devices, multiple database servers, and multiple applications servers, without deviating from the scope of the disclosure.

The requestor-computing device 102 may refer to a computing device (associated with a requestor in an organization) that may be communicatively coupled to the communication network 108. The requestor may correspond to an individual, such as a project manager, a staffing manager, a human resource manager, an administrator, and/or the like, who may utilize a computing device associated with the organization, such as the requestor-computing device 102, to initiate a process of allocating one or more tasks to one or more resources. The requestor-computing device 102 may include one or more processors in communication with one or more memory units. Further, in an embodiment, the one or more processors may be operable to execute one or more sets of computer readable codes, instructions, programs, or algorithms, stored in the one or more memory units, to perform one or more operations.

In an embodiment, the requestor may utilize the requestor-computing device 102 to communicate with the application server 106, via the communication network 108, to initiate a request for the allocation of the one or more tasks to the one or more resources. The one or more resources may correspond to one or more employees or workers associated with the organization. The requestor may utilize the requestor-computing device 102 to transmit one or more requests to the application server 106. In an embodiment, the requestor may utilize an application installed on the requestor-computing device 102 to transmit the one or more requests to the application server 106. In another embodiment, the requestor may login to a task allocation platform to transmit the one or more requests. The one or more requests may correspond to the allocation of the one or more tasks to the one or more resources of the organization. Further, in an embodiment, the requestor may utilize the requestor-computing device 102 to transmit at least one or more attributes of the one or more tasks and one or more predefined constraints associated with the allocation of the one or more tasks to the one or more resources to the application server 106 over the communication network 108. Hereinafter, the one or more attributes of the one or more tasks have been referred to as one or more first attributes. For example, the one or more first attributes comprise one or more skills that may be required to process the one or more tasks and one or more service level agreements (SLAs) of the one or more tasks. The one or more SLAs may comprise a baseline proficiency in each required skill, a baseline time, a baseline cost, a baseline efficiency, and a baseline quality associated with each of said one or more tasks that may be expected from the one or more resources who are working upon the one or more tasks. In an embodiment, the requestor may utilize the requestor-computing device 102 to define a threshold value for each of the one or more SLAs. The requestor may defined the one or more constraints based on at least the one or more SLAs of the one or more tasks and the one or more resource parameters such as workload, utilization, or productivity of the one or more resources. The one or more first attributes and the one or more pre-defined constraints have been discussed in detail in conjunction with FIG. 3.

The requestor-computing device 102 may further include a display screen that may be configured to display one or more graphical user interfaces (GUIs) rendered by a computing server, such as the application server 106. For example, after allocating the one or more tasks to the one or more resources, the application server 106 may render an allocation report on a user interface displaying the allocation of the one or more tasks to the one or more resources. Based on the allocation report, the requestor may utilize the requestor-computing device 102 to amend or update one or more of the one or more pre-defined constraints that were previously entered. In such a case, the application server 106 may generate a new allocation report that is rendered on the user interface displaying a new allocation of the one or more tasks to the one or more resources.

Examples of the requestor-computing device 102 may include, but is not limited to, a personal computer, a laptop, a personal digital assistant (PDA), a mobile device, a tablet, or any other computing devices.

The database server 104 may refer to a computing device or a storage device that may be communicatively coupled to the communication network 108. In an embodiment, the database server 104 may be configured to perform one or more database operations. The one or more database operations may include one or more of, but are not limited to, storing and processing one or more queries, data, or content. The one or more queries, data, or content may be received from or transmitted to one or more computing devices or one or more computing servers. For example, the database server 104 may be configured to store the one or more first attributes of the one or more tasks received from the requestor-computing device 102 over the communication network 108. For example, the one or more first attributes may comprise at least a type of each of the one or more tasks, a count of tasks of each type, a baseline time for processing each of task type, one or more skills required to process the one or more tasks, and the one or more other SLAs of the one or more tasks. The database server 104 may further be configured to store the one or more pre-defined constraints associated with the allocation of the one or more tasks. The one or more pre-defined constraints may be based on various resource parameters, such as a workload of the one or more resources, a utilization of the one or more resources, and a productivity of the one or more resources. In an embodiment, the database server 104 may receive the one or more pre-defined constraints from the requestor-computing device 102 or the application server 106 over the communication network 108.

In an embodiment, the database server 104 may further be configured to store one or more second attributes of the one or more resources. The one or more second attributes may comprise historical performances and current allocations of the one or more resources. The database server 104 may further be configured to store the one or more current skills of the one or more resources and a corresponding proficiency score in each of the one or more current skills. The database server 104 may further be configured to store the generated allocation report pertaining to the allocation of the one or more tasks to the one or more resources. In an embodiment, the database server 104 may receive the generated allocation report from the application server 106 over the communication network 108.

Further in an embodiment, the database server 104 may be configured to store one or more sets of instructions, codes, scripts, or programs that may be retrieved by the application server 106 to perform one or more associated operations. For querying the database server 104, one or more querying languages may be utilized, such as, but not limited to, SQL, QUEL, and DMX. In an embodiment, the database server 104 may be realized through various technologies such as, but not limited to, Microsoft® SQL Server, Oracle®, IBM DB2®, Microsoft Access®, PostgreSQL®, MySQL® and SQLite®, and/or the like.

The application server 106 may refer to a computing device or a software framework hosting an application or a software service that may be communicatively coupled to the communication network 108. In an embodiment, the application server 106 may be implemented to execute procedures such as, but not limited to, the one or more sets of programs, instructions, codes, routines, or scripts stored in one or more memories for supporting the hosted application or the software service. In an embodiment, the hosted application or the software service may be configured to perform the one or more associated operations.

In an embodiment, the application server 106 may be configured to receive the one or more requests, pertaining to the allocation of the one or more tasks to the one or more resources associated with the entity (e.g., the organization). The one or more requests may be received from the requestor-computing device 102 over the communication network 108. The one or more requests may further include at least the one or more first attributes of the one or more tasks and the one or more pre-defined constraints associated with the allocation of the one or more tasks. The one or more first attributes may comprise at least a type of each of the one or more tasks, a count of tasks of each type, a baseline time of each of task type, one or more skills required to process the one or more tasks, and the one or more SLAs of the one or more tasks. The one or more pre-defined constraints are based on the one or more SLAs of the one or more tasks and/or the one or more resource parameters. The one or more resource parameters may correspond to the workload, utilization, or productivity of the one or more resources.

Further, in an embodiment, the application server 106 may be configured to extract the one or more second attributes, associated with the one or more resources, from the database server 104 over the communication network 108. The application server 106 may transmit one or more queries, determined based on at least the one or more first attributes of the one or more tasks, to extract the one or more second attributes of the one or more resources from the database server 104. The one or more second attributes of the one or more resources may comprise one or more of, but are not limited to, one or more current skills of the one or more resources, a historical performance of the one or more resources, a current allocation of the one or more resources, and a proficiency score of the one or more resources in the one or more current skills.

Further, in an embodiment, the application server 106 may be configured to determine the allocation of the one or more tasks to the one or more resources. The allocation of the one or more of tasks to the one or more resources may be determined based on at least the one or more first attributes and the one or more second attributes, such that the one or more pre-defined constraints are satisfied. The determination of the allocation of the one or more tasks to the one or more resources has been described in detail in conjunction with FIG. 3.

Based on the determined allocation, the requestor (or the application server 106) may update one or more of the one or more pre-defined constraints based on at least an update in the threshold values associated with the one or more SLAs and/or the one or more resource parameters. In such a case, the application server 106 may update the allocation of the one or more tasks to the one or more resources. Thereafter, the application server 106 may be configured to generate the allocation report based on the determined allocation. The application server 106 may render the generated allocation report on the user interface displayed on the display screen of the requestor-computing device 102.

Further, in an embodiment, the application server 106 may be configured to monitor the real-time performance of each of the one or more resources based on at least a current status of processing of the allocated one or more tasks by the one or more resources. The monitoring of the real-time performances of the one or more resources may include at least a count of tasks processed by the one or more resources, a time taken by the one or more resources to process the count of tasks, and a count of baseline violations. In an embodiment, the application server 106 may re-allocate the one or more tasks to the one or more other resources based on at least the monitored real-time performance of each of the one or more resources.

Based on the allocation determined by the application server 106, the application server 106 ensures that the one or more pre-defined constraints are satisfied meeting the one or more SLAs. For example, the determined allocation allocates the one or more tasks to the one or more employees of the organization considering the one or more skills required to perform the one or more tasks and the one or more skills possessed by the one or more employees. Hence, the determined allocation ensures a fairness among the one or more employees in terms of the workload assigned. The determined allocation further ensures that the utilization of one or more employees is within a specified range and hence further ensures efficient utilization of the employee's time. The determined allocation further ensures that the productivity of each of the one or more employees does not exceed the specified upper bound so that every employee has a fair chance to get a share of incentive. The determined allocation further minimizes the number and magnitude of baseline violations of tasks. The determined allocation performs dynamic re-allocation of the one or more tasks to the one or more employees based on the real-time performance of the one or more employees. The determined allocation ensures efficient and effective team composition and workload for better day-to-day capacity planning in the organization. The re-allocation of the one or more tasks has been described in detail in conjunction with FIG. 3.

The application server 106 may be realized through various types of application servers such as, but not limited to, a Java application server, a .NET framework application server, a Base4 application server, a PHP framework application server, or any other application server framework.

A person having ordinary skill in the art will appreciate that the scope of the disclosure is not limited to realizing the application server 106 and the requestor-computing device 102 as separate entities. In an embodiment, the application server 106 may be realized as an application program installed on and/or running on the requestor-computing device 102 without departing from the scope of the disclosure.

A person having ordinary skill in the art will understand that the scope of the disclosure is not limited to the database server 104 as a separate entity. In an embodiment, the functionalities of the database server 104 may be integrated into the application server 106, and vice-versa, without deviating from the scope of the disclosure.

The communication network 108 may include a medium through which devices, such as the requestor-computing device 102, the database server 104, and the application server 106, may communicate with each other. Examples of the communication network 108 may include, but not limited to, the Internet, a cloud network, a Wireless Fidelity (Wi-Fi) network, a Wireless Local Area Network (WLAN), a Local Area Network (LAN), a wireless personal area network (WPAN), a Wireless Local Area Network (WLAN), a wireless wide area network (WWAN), a cloud network, a Long Term Evolution (LTE) network, a plain old telephone service (POTS), and/or a Metropolitan Area Network (MAN). Various devices in the system environment 100 may be configured to connect to the communication network 108, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, such as Long Term Evolution (LTE), Light Fidelity (Li-Fi), and/or other cellular communication protocols or Bluetooth (BT) communication protocols.

Figure 2:
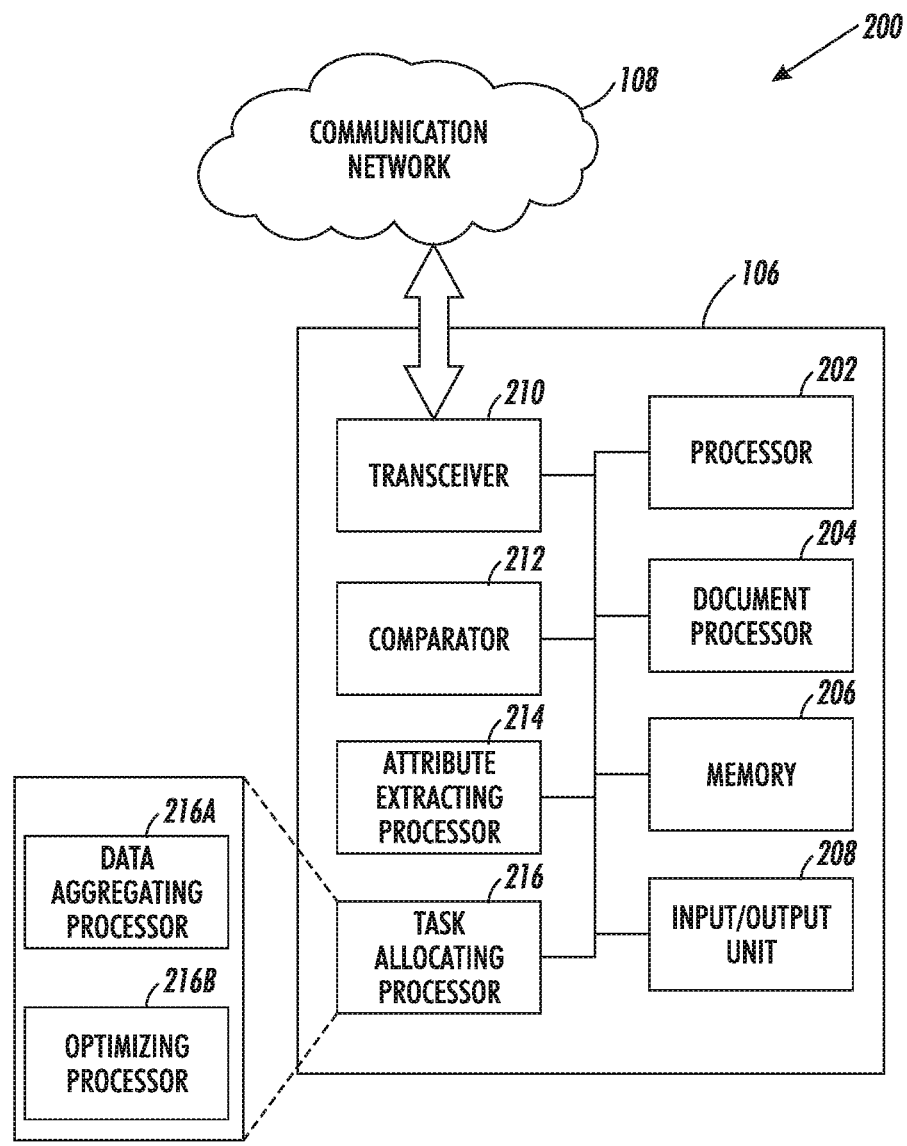
FIG. 2 is a block diagram that illustrates a computing server for auto-allocation of tasks to resources, in accordance with at least one embodiment.

FIG. 2 is a block diagram that illustrates a system for auto-allocation of the one or more tasks to the one or more resources, in accordance with at least one embodiment. With reference to FIG. 2, there is shown a system 200 that may include one or more processors, such as a processor 202, one or more document processors, such as a document processor 204, one or more memories, such as a memory 206, one or more input/output (I/O) units, such as an input/output (I/O) unit 208, one or more transceivers, such as transceiver 210, one or more comparator units, such as a comparator unit 212, one or more attribute extracting processors, such as an attribute extracting processor 214, and one or more task allocating processors, such as a task allocating processor 216.

The system 200 may correspond to a computing server, such as the application server 106, or a computing device, such as the requestor-computing device 102, without departing from the scope of the disclosure. However, for the purpose of the ongoing description, the system 200 corresponds to the application server 106.

The processor 202 comprises one or more suitable logics, circuitries, interfaces, and/or codes that may be configured to execute one or more set of instructions, programs, or algorithms stored in the memory 206 to perform one or more associated operations. For example, the processor 202 may be configured to process the extracted information (e.g., the one or more second attributes) and the received information (e.g., the one or more first attributes and the one or more pre-defined constraints) to determine the allocation of the one or more tasks to the one or more resources, such that the one or more pre-defined constraints are satisfied. The processor 202 may be communicatively coupled to the document processor 204, the memory 206, the I/O unit 208, the transceiver 210, and the comparator unit 212. The processor 202 may be implemented based on a number of processor technologies known in the art. Examples of the processor 202 may include, but not limited to, an X86-based processor, a Reduced Instruction Set Computing (RISC) processor, an Application-Specific Integrated Circuit (ASIC) processor, a Complex Instruction Set Computing (CISC) processor, and/or other processor.

The document processor 204 comprises one or more suitable logics, circuitries, interfaces, and/or codes that may be configured to execute one or more set of instructions, programs, or algorithms stored in the memory 206 to perform one or more associated operations. For example, the document processor 204 may be configured to generate the allocation report based on the determined allocation of the one or more tasks to the one or more resources. The document processor 204 may be communicatively coupled to the processor 202, the memory 206, the I/O unit 208, the transceiver 210, and the comparator unit 212. The document processor 204 may be implemented based on a number of processor technologies known in the art. For examples, the document processor 204 may be implemented using one or more of, but not limited to, an X86-based processor, a Reduced Instruction Set Computing (RISC) processor, an Application-Specific Integrated Circuit (ASIC) processor, a Complex Instruction Set Computing (CISC) processor, and/or other processor. Examples of document processor 204 may include, but not limited to PTC® Arbortext, Adobe® Framemaker, LYX, Broadvision QuickSilver, and/or Serna XML editor.

The memory 206 may be operable to store one or more machine codes, and/or computer programs having at least one code section executable by the processor 202 or the document processor 204. The memory 206 may store one or more sets of instructions, programs, codes, or algorithms that may be executed by the processor 202 or the document processor 204 to perform the one or more associated operations of the application server 106. Further, the memory 206 may include one or more buffers (not shown) that may be configured to store information such as the one or more requests, the one or more first attributes of the one or more resources, the one or more second attributes of the one or more resources, and/or the like. Some of the commonly known memory implementations include, but are not limited to, a random access memory (RAM), a read-only memory (ROM), a hard disk drive (HDD), and a secure digital (SD) card. In an embodiment, the memory 206 may include the one or more machine codes, and/or computer programs that are executable by the processor 202 or the document processor 204 to perform specific operations. It will be apparent to a person having ordinary skill in the art that the one or more instructions stored in the memory 204 enables the hardware of the system 200 to perform the one or more associated operations.

The I/O unit 208 comprises one or more suitable logics, circuitries, interfaces, and/or codes that may be operable to receive the one or more requests from the requestor-computing device 102 through the transceiver 210. The I/O unit 208 may be operable to communicate with the processor 202 or the document processor 204. Further, the I/O unit 208, in conjunction with the transceiver 210, may be configured to transmit the determined allocation pertaining to the one or more requests to the requestor-computing device 102 or the database server 104. The I/O unit 208 may be operable to communicate with the processor 202, the document processor 204, the memory 206, the transceiver 210, and the comparator 212. Examples of the input devices may include, but are not limited to, a touch screen, a keyboard, a mouse, a joystick, a microphone, a camera, a motion sensor, a light sensor, and/or a docking station. Examples of the output devices may include, but are not limited to, a speaker system and a display screen.

The transceiver 210 comprises one or more suitable logics, circuitries, interfaces, and/or codes that may be configured to receive or transmit the one or more queries, data, content, or other information to/from one or more computing devices (e.g., the database server 104 or the requestor-computing device 102) over the communication network 108. The transceiver 210 may implement one or more known technologies to support wired or wireless communication with the communication network 108. In an embodiment, the transceiver 210 may include, but is not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. The transceiver 210 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as: Global System for Mobile Communications (GSM), Enhanced Data GSM Environment (EDGE), wideband code division multiple access (W-CDMA), code division multiple access (CDMA), time division multiple access (TDMA), Bluetooth, Light Fidelity (Li-Fi), Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The comparator 212 comprises one or more suitable logics, circuitries, interfaces, and/or codes that may be configured to execute the one or more instructions stored in the memory 206. The comparator 212 may be configured to compare at least two input signals to generate an output signal. In an embodiment, the output signal may correspond to either "1" or "0." In an embodiment, the comparator 212 may generate output "1" if the value of a first signal (from the at least two signals) is greater than a value of the second signal (from the at least two signals). Similarly, the comparator 212 may generate an output "0" if the value of the first signal is less than the value of the second signal. In an embodiment, the comparator 212 may be realized through either software technologies or hardware technologies known in the art. Though, the comparator 212 is depicted as independent from the processor 202 in FIG. 2, a person skilled in the art will appreciate that the comparator 212 may be implemented within the processor 202 without departing from the scope of the disclosure.

The attribute extracting processor 214 comprises one or more suitable logics, circuitries, interfaces, and/or codes that may be configured to execute one or more set of instructions, programs, or algorithms stored in the memory 206 to perform one or more associated operations. For example, the attribute extracting processor 214 may be configured to extract the one or more second attributes of the one or more resources from the database server 104. The attribute extracting processor 214 may be communicatively coupled to the processor 202, the document processor 204, the memory 206, the I/O unit 208, the transceiver 210, the comparator unit 212, and the task allocating processor 216. The attribute extracting processor 214 may be implemented based on a number of processor technologies known in the art. For examples, the attribute extracting processor 214 may be implemented using one or more of, but not limited to, an X86-based processor, a Reduced Instruction Set Computing (RISC) processor, an Application-Specific Integrated Circuit (ASIC) processor, a Complex Instruction Set Computing (CISC) processor, and/or other processor.

The task allocating processor 216 comprises one or more suitable logics, circuitries, interfaces, and/or codes that may be configured to execute one or more set of instructions, programs, or algorithms stored in the memory 206 to perform one or more associated operations. For example, the task allocating processor 216 may be configured to determine the allocation of the one or more tasks to the one or more resources. The task allocating processor 216 may be communicatively coupled to the processor 202, the document processor 204, the memory 206, the I/O unit 208, the transceiver 210, the comparator unit 212, and the attribute extracting processor 214. In an embodiment, the task allocating processor 216 may comprise a data aggregating processor 216A. The data aggregating processor 216A may be configured to aggregate the received one or more first attributes, the extracted one or more second attributes, and the one or more pre-defined constraints. In an embodiment, the task allocating processor 216 may further comprise an optimizing processor 216B. The optimizing processor 216B may be configured to minimize a magnitude of violations (for the tasks for which the baselines may be violated) by following the one or more pre-defined constraints provided by the requestor. The task allocating processor 216 may be implemented based on a number of processor technologies known in the art. For examples, the task allocating processor 216 may be implemented using one or more of, but not limited to, an X86-based processor, a Reduced Instruction Set Computing (RISC) processor, an Application-Specific Integrated Circuit (ASIC) processor, a Complex Instruction Set Computing (CISC) processor, and/or other processor.

Figure 3:
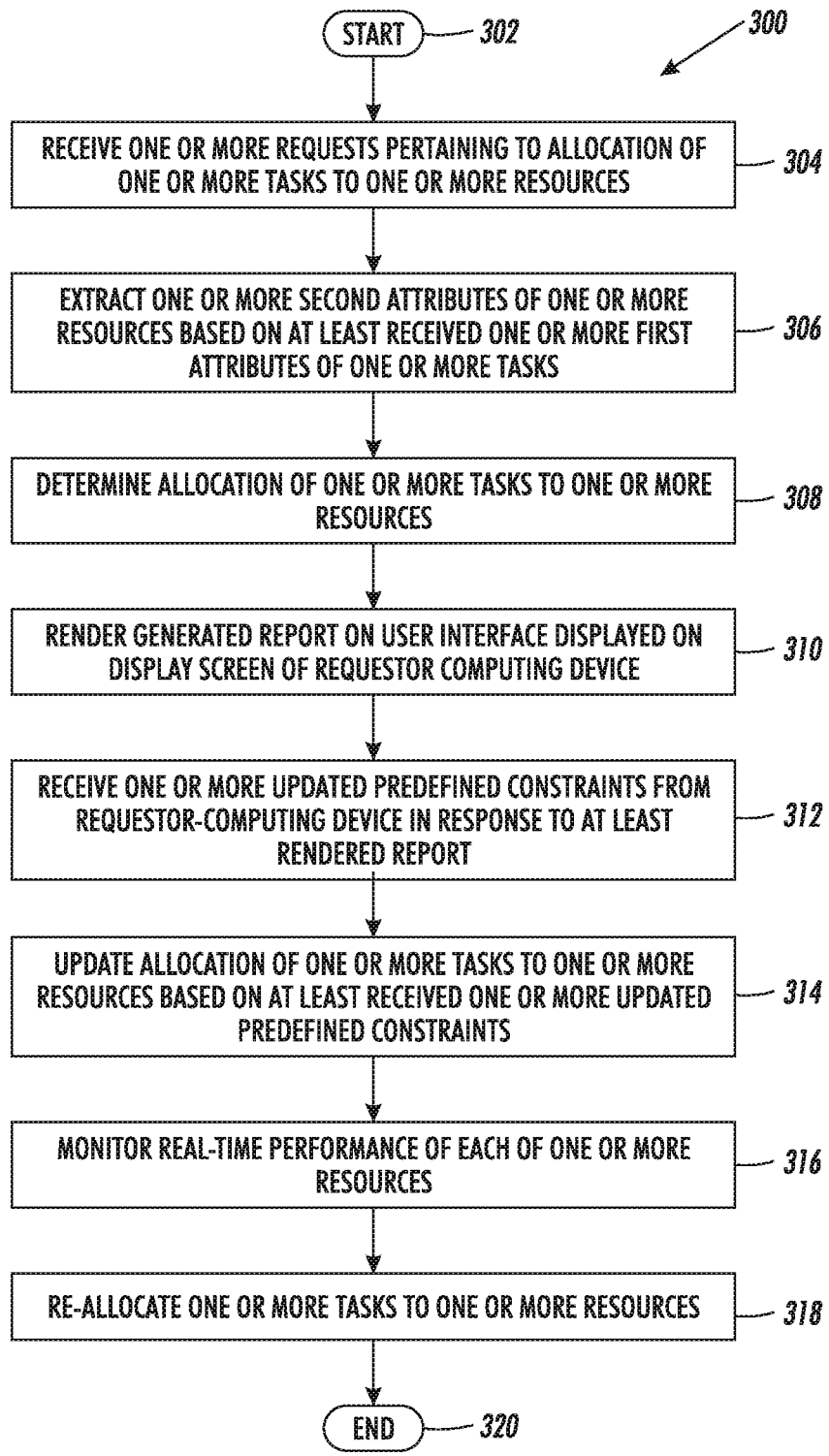
FIG. 3 is a flowchart that illustrates a method for auto-allocation of tasks to resources, in accordance with at least one embodiment.

FIG. 3 is a flowchart that illustrates a method for auto-allocation of tasks to resources of the organization, in accordance with at least one embodiment. With reference to FIG. 3, there is shown a flowchart 300 that is described in conjunction with FIG. 1 and FIG. 2. The method starts at step 302 and proceeds to step 304.

At step 304, the one or more requests, pertaining to the allocation of the one or more tasks to the one or more resources, are received. In an embodiment, the processor 202, in conjunction with the transceiver 210, may be configured to receive the one or more requests pertaining to the allocation of the one or more tasks to the one or more resources. In an embodiment, the processor 202, in conjunction with the transceiver 210, may receive the one or more requests from the requestor-computing device 102 over the communication network 108. In an embodiment, the requestor may utilize the application installed on the requestor-computing device 102 or may utilize the task allocation platform facilitated by the organization over the web through the communication network 108 to transmit the one or more requests to the transceiver 210. In an embodiment, the one or more requests may comprise at least the one or more first attributes of the one or more tasks. The one or more first attributes may comprise various information about the one or more tasks such as, but are not limited to, the type of each of the one or more tasks, the count of tasks of each type, the baseline time associated with each task type, the count of resources required to process each of the one or more tasks, and the time taken by each resource to process the tasks of each type in the past. The one or more first attributes may further comprise the one or more skills required to process each of the one or more tasks and the corresponding proficiency score required for each of the one or more required skills.

The one or more first attributes may further comprise the one or more SLAs of the one or more tasks. The one or more SLAs of the one or more tasks comprise at least one or more of, but are not limited, a baseline time, a baseline cost, a baseline efficiency, and a baseline quality associated with each of the one or more tasks. In an embodiment, the baseline time of a task corresponds to a time duration within which a resource or a group of resources may complete the processing of the task. In an embodiment, the baseline cost of the task corresponds to a cost or a range of cost for which the resource or the group of resources may complete the processing of the task, i.e., there is no extra cost involved in the processing of the task other than the specified cost or specified range of cost. In an embodiment, the baseline efficiency of the task corresponds to a minimum efficiency that must be achieved by the resource or the group of resources during or after the processing of the task. In an embodiment, the baseline quality of the task corresponds to a minimum quality that is expected from the resource or the group of resources during or after the processing of the task.

Further, in an embodiment, the one or more requests may comprise the one or more pre-defined constraints. Prior to transmitting the one or more requests, the requestor may utilize the requestor-computing device 102 to define the one or more constraints. The one or more constraints may be defined by the requestor based on at least the one or more SLAs associated with the one or more tasks and/or the one or more resource parameters associated with each of the one or more resources. The one or more resource parameters may correspond to at least workload, utilization, and productivity associated with the one or more resources. For example, a first constraint may be defined based on at least a current workload of a resource, an average workload of the one or more resources, and a constant factor (used to limit any deviation of workload of the resource from the average workload) defined by the requestor in the range [0, 1]. A second constraint may be defined based on at least a current utilization of the resource. The current utilization of the resource must lie in a range defined by the requestor, i.e., between a lower bound utilization value and an upper bound utilization value. A third constraint may be defined based on productivity of the resource. The productivity of the resource must lie within a productivity limit defined by the requestor. In an embodiment, the requestor may utilize the requestor-computing device 102 to transmit the threshold value associated with the each of the one or more SLAs (e.g., time, efficiency, quality, etc.) and the one or more resource parameters (e.g., workload, utilization, productivity, etc.) to the transceiver 210 over the communication network 108. After receiving the one or more requests, the one or more first attributes, and the one or more pre-defined constraints, the processor 202, in conjunction with the transceiver 210, may store the received one or more requests, the received one or more first attributes, the received one or more pre-defined constraints, and the corresponding threshold values in a storage device, such as the memory 206 or the database server 104.

At step 306, the one or more second attributes of the one or more resources are extracted based on at least the received one or more first attributes of the one or more tasks. In an embodiment, the attribute extracting processor 214 may be configured to extract the one or more second attributes of the one or more resources. In an embodiment, the attribute extracting processor 214 may extract the one or more second attributes of the one or more resources from the database server 104. The database server 104 may be configured to manage a repository of resource data comprising personal and/or professional information of the one or more resources. The attributes extracting processor 214 may transmit a query, based on at least the one or more first attributes of the one or more tasks, to the database server 104 to extract the one or more second attributes of the one or more resources. In an embodiment, the one or more second attributes may include the personal and/or professional information of the one or more resources, such as demographic data (e.g., name, identifier number, work experience, and/or the like) of the one or more resources, a count of available resources, the one or more current skills of the one or more resources and the proficiency score (or level) in each of the one or more current skills. The one or more second attributes may further include the historical performance and the current allocation of the one or more resources.

In an embodiment, the attribute extracting processor 214 may extract the one or more second attributes of the one or more resources from the database server 104 based on at least the received one or more first attributes of the one or more tasks. For example, the attribute extracting processor 214 may extract the one or more second attributes of the one or more resources from the database server 104 based on the one or more required skills to process the one or more tasks of each type. In such a case, the attribute extracting processor 214 may extract the one or more second attributes of the one or more resources (from the database server 104), with at least one of the one or more required skills. In another exemplary scenario, the attribute extracting processor 214 may extract the one or more second attributes of the one or more resources from the database server 104 based on the proficiency level required to work upon the one or more tasks irrespective of the one or more required skills. In such a case, the attribute extracting processor 214 may extract the one or more second attributes of the one or more resources (from the database server 104), with proficiency levels greater than or equal to the required proficiency level. In another exemplary scenario, the attribute extracting processor 214 may extract the one or more second attributes of the one or more resources from the database server 104 based on both the one or more required skills and a corresponding proficiency level in each of the one or more required skills. In another exemplary scenario, the attribute extracting processor 214 may extract the one or more second attributes of the one or more resources from the database server 104 if the one or more resources have worked upon a task in the past that is of the same type as that of the one or more tasks. In another exemplary scenario, the attribute extracting processor 214 may extract the one or more second attributes of the one or more resources from the database server 104 if the current utilization of the one or more resources is below a pre-define utilization value. After extracting the one or more second attributes of the one or more resources, the attribute extracting processor 214 may store the one or more second attributes of the one or more resources in the storage device, such as the memory 206.

A person having ordinary skill in the art will understand that the scope of the disclosure is not limited to the extraction of the one or more second attributes of the one or more resources as discussed above. The various ways of extracting the one or more second attributes, as discussed above, are provided for illustrative purposes only and should not be taken to limit the scope of the disclosure.

At step 308, the allocation of the one or more tasks to the one or more resources is determined. In an embodiment, the task allocating processor 216 may be configured to determine the allocation of the one or more tasks to the one or more resources. In an embodiment, the task allocating processor 216 may determine the allocation of the one or more tasks to the one or more resources based on at least the received one or more first attributes and/or the extracted one or more second attributes, such that the one or more pre-defined constraints are satisfied. In an embodiment, the task allocating processor 216 may determine the allocation of the one or more tasks to the one or more resources based on at least a comparison of the received one or more first attributes with the extracted one or more second attributes, such that the one or more pre-defined constraints are satisfied. In case of an effective and efficient allocation by the processor 202 in conjunction with the task allocating processor 216, the one or more pre-defined constraints provided by the requestor are satisfied, and at the same time, such allocation ensures an efficient and effective team composition of the one or more resources who may work upon the one or more tasks. Such efficient and effective team composition of the one or more resources may result into a timely deliverable of the one or more tasks, and hence a better day-to-day planning of the one or more tasks in the organization.

Prior to the determination of the allocation, the task allocating processor 216 may extract the received one or more first attributes, the extracted one or more second attributes, and the one or more pre-defined constraints from the storage device, such as the memory 206. Thereafter, the task allocating processor 216 may utilize an aggregating processing device, such as the data aggregating processor 216A, to aggregate the received one or more first attributes, the extracted one or more second attributes, and the one or more pre-defined constraints. In an embodiment, the data aggregating processor 216A may be configured to consistently aggregate the received one or more first attributes, the extracted one or more second attributes, and the one or more pre-defined to generate aggregated data. The aggregated data may be given as input to an optimizing unit, such as the optimizing processor 216B. In an embodiment, the optimizing processor 216B may utilize the aggregated data to formulate a problem, such as an integer linear program, and thereafter, may process or execute the integer linear program to determine the allocation, such that the one or more pre-defined constraints are satisfied. The optimizing processor 216B may be configured to minimize the magnitude of violations (for the tasks for which the baselines may be violated) by following the one or more pre-defined constraints provided by the requestor.

In an exemplary scenario, the optimizing processor 216B may execute or process the integer linear program (ILP), based on the following relation, to determine the allocation of the one or more tasks to the one or more resources, such that the one or more ore-defined constraints are satisfied:

$$\text{Minimise} \sum_{i=1}^{m} \sum_{j=1}^{n} x_j^i \times obj_j^i \text{ where,} \quad (1)$$

$$obj_j^i = \begin{cases} -\log\left(\dfrac{v_{mag} \times b_j - t_j^i}{b_j \times (v_{mag} - 1)}\right) & \text{if } t_j^i \geq b_j, \\ 0 & \text{Otherwise} \end{cases} \quad \begin{array}{l} \text{subject to following} \\ \text{predefined constraints} \end{array}$$

-continued $$\sum_{i=1}^{m} x_j^i = 1 \ \forall \ j \in \{1, 2, \ldots, n\} \quad (C1)$$

$$\sum_{i=1}^{m} \sum_{j=1}^{n} x_j^i \times 1_+(t_j^i - b_j) \leq v_{lim} \times n \quad (C2)$$

$$|wl_i - wl_{avg}| < wl_{lim} \times wl_{avg} \ \forall \ i \in \{1, 2, \ldots, m\} \quad (C3)$$

$$\frac{\sum_{j=1}^{n} x_j^i \times b_j}{\sum_{j=1}^{n} x_j^i \times t_j^i} < p_{lim} \ \forall \ i \in \{1, 2, \ldots, m\} \quad (C4)$$

$$\sum_{j=1}^{n} x_j^i \times t_j^i \geq u_{min} \times avail_i \ \forall \ i \in \{1, 2, \ldots, m\} \quad (C5)$$

$$\sum_{j=1}^{n} x_j^i \times t_j^i \leq u_{max} \times avail_i \ \forall \ i \in \{1, 2, \ldots, m\} \quad (C6)$$

$$x_j^i \in \{0, 1\} \ \forall \ i \in \{1, 2, \ldots, m\}; \forall \ j \in \{1, 2, \ldots, n\} \quad (C7)$$

where, m: corresponds to a count of the one or more resources;
n: corresponds to a count of the one or more tasks;
i: corresponds to an index for referring to the one or more resources;
j: corresponds to an index for referring to the one or more tasks;
$t_j^i$: corresponds to a time taken by a resource (e.g., an employee "$e_i$") to process a task "$\tau_j$," wherein the time taken may correspond to an average time, a worst-case time, from a distribution, and/or the like;
$b_j$: corresponds to a baseline time for the task "$\tau_j$"; comes from the baseline time of the task type to which the task "$\tau_j$" belongs to;
$p_{lim}$: corresponds to an upper bound threshold value on the productivity defined by the requestor; $p_{lim} \in [1, \infty)$;

$$1_+(f) = \begin{cases} 1 & \text{if } f > 0 \\ 0 & \text{if } f \leq 0 \end{cases}$$

$wl_i = \sum_{j=1}^{n} x_j^i \times t_j^i$: corresponds to a workload of the resource "$e_i$";

$$wl_{avg} = \frac{1}{m} \sum_{i=1}^{m} wl_i:$$

corresponds to an average workload of the one or more resources;
$wl_{lim} \in [0, 1]$: corresponds to a factor, used to limit the deviation of the workload of any of the one or more resources from the average workload, defined by the requestor;
$v_{lim} \in [0, 1]$: corresponds to a factor, used to set the count of the one or more tasks for which baseline times may be violated, defined by the requestor;
$avail_i$: corresponds to an available time of a resource, say in a shift, defined by the requestor;
$u_{min} \in (0, 1]$: corresponds to a factor, used to set a lower bound on the utilization of the resource, defined by the requestor;
$u_{max} \in (u_{min}, \infty)$: corresponds to a factor, used to set an upper bound on the utilization of the resource, defined by the requestor;
$v_{mag} \in [1, \infty)$: corresponds to a factor, indicating a margin by which baseline violations are acceptable, defined by the requestor; and
$x_j^i$: corresponds to an indicator variable which indicates whether the task "$\tau_j$" is assigned to the resource "$e_i$" or not.

In an embodiment, the optimizing processor 216B may execute the constraint (C1) that corresponds to the task assignment. The constraint (C1) combined with constraint (C7) may enforce the optimizing processor 216B to assign or allocate each task of the one or more tasks to exactly one resource from the one or more resources. The constraint (C2) may enforce the optimizing processor 216B to keep the count of baseline violations within the defined limit. The constraint (C3) may specify that the workload deviation of any of the one or more resources is within the defined range from the average workload range of the one or more resources. The constraint (C4) may enforce the optimizing processor 216B to keep the productivity of any of the one or more resources within the defined upper bound threshold value. The constraint (C5) and the constraint (C6) may enforce the optimizing processor 216B to keep the utilization of the any of the one or more resources between the defined lower bound and the defined upper bound.

In an embodiment, the optimizing processor 216B may optimize the ILP problem (equation-1) to meet as much SLAs as possible by keeping the count of baseline violation within the defined limit and further by minimizing the magnitude of these violations. By setting a non-linear cost for the magnitude of violations beyond a defined threshold (indicated by $v_{mag}$), the optimizing processor 216B may be increasingly configured to minimize the magnitude of violations as much as possible.

After determining the allocation of the one or more tasks to the one or more resources, the task allocating processor 216 may store the determined allocation in the storage device such as the memory 206 or the database server 104. Further, in an embodiment, the document processor 204 may retrieve the determined allocation from the memory 206 to generate the allocation report. The document processor 204 may generate the allocation report by using at least the determined allocation of the one or more tasks to the one or more resources. The generated allocation report may further include a count of baseline time that will be potentially violated, a minimum and maximum workload of the one or more resources with the determined allocation, and a minimum and maximum productivity of the one or more resources with the determined allocation.

At step 310, the generated allocation report is rendered on the user interface displayed on the display screen of the requestor-computing device 102. In an embodiment, the processor 202, in conjunction with the document processor 204, may be configured to render the generated allocation report on the user interface displayed on the display screen of the requestor-computing device 102.

At step 312, one or more updated predefined constraints are received from the requestor-computing device 102 in response to at least the rendered allocation report. In an embodiment, the processor 202, in conjunction with the transceiver 210, may be configured to receive the one or more updated predefined constraints from the requestor-computing device 102 in response to at least the rendered allocation report over the communication network 108. Prior to the transmitting of the one or more updated predefined constraints, the requestor may utilize the requestor-computing device 102 to view or review the generated allocation report rendered by the processor 202. In case the requestor wishes to amend or update the bounds corresponding to the one or more of the one or more pre-defined constraints, the requestor may amend or update the threshold values associated with the one or more SLAs and/or the one or more resource parameters (e.g., productivity, workload, and utilization of the one or more resources). Thereafter, the requestor may utilize the requestor-computing device 102 to transmit the one or more updated pre-defined constraints to the application server 106 over the communication network 108.

At step 314, the allocation of the one or more tasks to the one or more resources is updated based on at least the received one or more updated predefined constraints. In an embodiment, the processor 202, in conjunction with the task allocating processor 216, may be configured to update the allocation of the one or more tasks to the one or more resources. In an embodiment, the processor 202, in conjunction with the task allocating processor 216, may update the allocation of one or more tasks to the one or more resources based on at least the one or more updated predefined constraints received from the requestor-computing device 102. Thereafter, the document processor 204 may update the allocation report based on the updated allocation to generate an updated allocation report. Further, in an embodiment, the processor 202, in conjunction with the document processor 204, may be configured to render the updated allocation report on the user interface displayed on the display screen of the requestor-computing device 102. Further, in an embodiment, the processor 202 may be configured to transmit the respective determined allocations of the one or more resources to one or more resource-computing devices (not shown) associated with the one or more resources. Each of the one or more resources may utilize his/her respective one or more resource-computing devices to view his/her allocation. Further, each of the one or more resources may utilize his/her respective one or more resource-computing devices to process the allocated one or more tasks.

At step 316, the real-time performance of each of the one or more resources is monitored. In an embodiment, the processor 202 may be configured to monitor the real-time performance of each of the one or more resources. In an embodiment, the processor 202 may monitor the real-time performance of each of the one or more resources based on at least the processing of the allocated one or more tasks by the one or more resources. For example, the monitoring of the real-time performance of a resource may be determined based on one or more of, but not limited to, a count of tasks processed by the resource, a total time taken by the resource to process the count of tasks, a quality of task deliverables, and a count of baseline violations. The processor 202 may store the monitored real-time performance of each of the one or more resources in the storage device, such as the memory 206 or the database server 104.

At step 318, the one or more tasks to the one or more resources are re-allocated. In an embodiment, the processor 202, in conjunction with the task allocating processor 216B, may be configured to re-allocate the one or more tasks to the one or more resources. The one or more tasks may be re-allocated based on the monitored real-time performance of the one or more resources. For example, based on the allocation, an employee, "employee-A," has to complete "4 tasks" in "10 hours." It has been previously determined that the "employee-A" may complete each task in "2.5 hours". After "7.5 hours" of the work, the processor 202 determines that the "employee-A" has completed only "2 tasks" out of the allocated "4 tasks." In such a case, it may not be possible (or be difficult) for the "employee-A" to complete the remaining "2 tasks" in the remaining "2.5 hours." In such a case, the processor 202, in conjunction with the task allocating processor 216, may re-allocate one of the remaining "2 tasks" to some other resource based on his/her availability of bandwidth to process the re-allocated task. Based on the re-allocation, the task allocating processor 216 may update the allocation of one or more tasks to the one or more resources. Control passes to end step 320.

Figure 4:
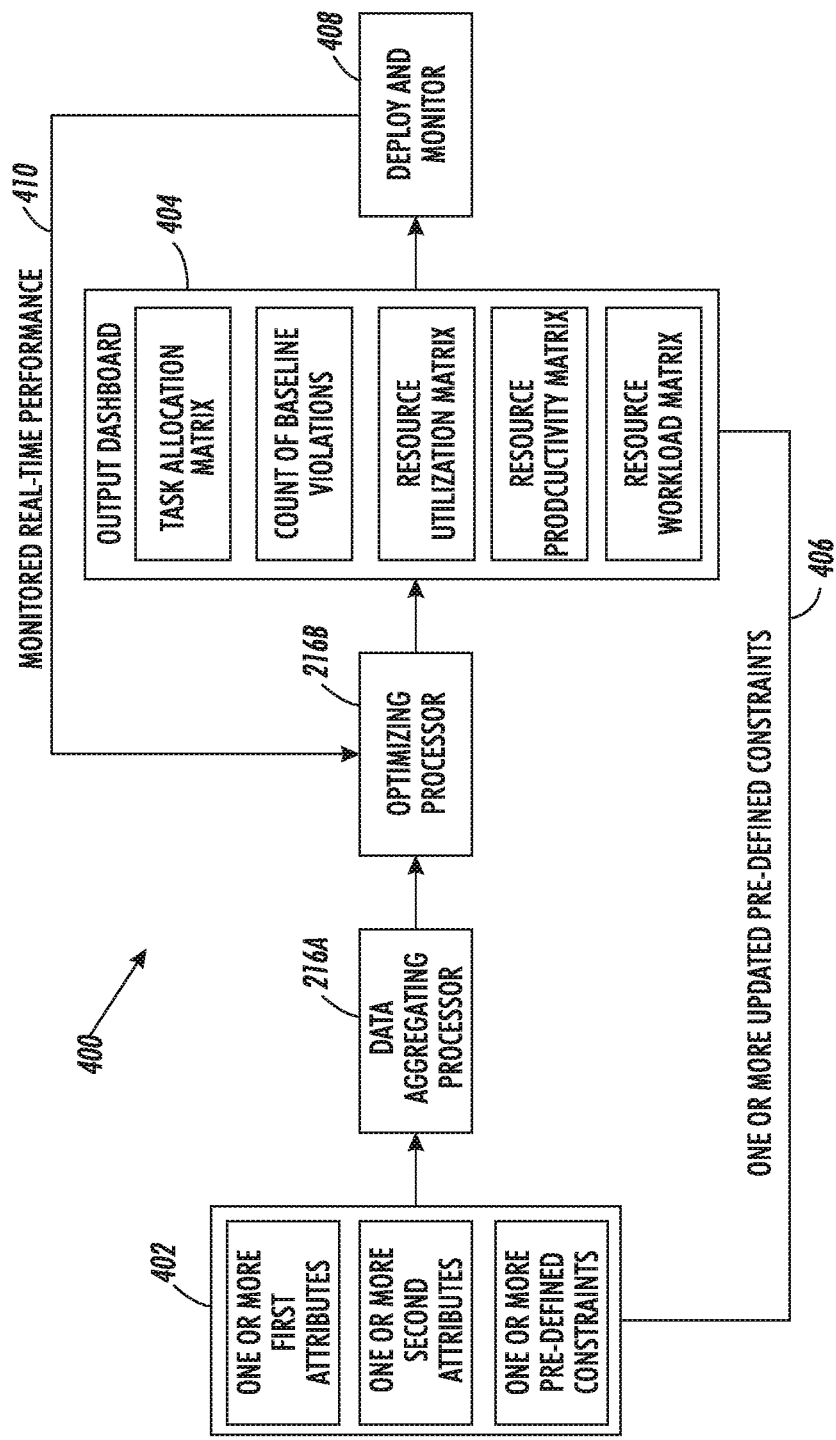
FIG. 4 is a block diagram that illustrates a flow diagram for auto-allocation of tasks to resources, in accordance with at least one embodiment.

FIG. 4 is a block diagram that illustrates a flow diagram for auto-allocation of tasks to resources, in accordance with at least an embodiment. With reference to FIG. 4, there is shown a flow diagram 400 that is described in conjunction with elements from FIG. 1, FIG. 2, and FIG. 3.

Prior to the allocation of the one or more tasks to the one or more resources, the processor 202 may store the one or more first attributes, the one or more pre-defined constraints, and/or the corresponding threshold values received from the requestor-computing device 102 in the memory 206. Further, in an embodiment, the attribute extracting processor 214 may store the one or more second attributes extracted from the database server 104 in the memory 206. Thereafter, the data aggregating processor 216A may be configured to retrieve the data (denoted by 402), such as the received one or more first attributes (e.g., the one or more required skills and the one or more SLAs), the extracted one or more second attributes, the received one or more pre-defined constraints, and one or more associated threshold values from the memory 206. Further in an embodiment, the data aggregating processor 216A may aggregate the retrieved data to generate the aggregated data that is transmitted as input to the optimizing processor 216B.

After receiving the aggregated data, the optimizing processor 216B may utilize the aggregated data to formulate the ILP problem. Further, in an embodiment, the optimizing processor 216B may optimize the ILP problem (equation-1) to determine the allocation of the one or more tasks to the one or more resources, such that the one or more pre-defined constraints are satisfied. After the determination of the allocation, the processor 202, in conjunction with the task allocating processor 216, may render the user interface, such as an output dashboard 404, on the display screen of the requestor-computing device 102. The processor 202, in conjunction with the task allocating processor 216, may display various information through the output dashboard 404. For example, the output dashboard 404 may display a task allocation matrix that comprises the allocation of the one or more tasks to the one or more resources. The output dashboard 404 may further display the count of baseline violations and the corresponding magnitude of violations. The output dashboard 404 may further display a resource utilization matrix that comprises the current utilization of the one or more resources after the allocation of the one or more tasks to the one or more resources. The output dashboard 404 may further display a resource productivity matrix that comprises the current productivity of the one or more resources after the allocation of the one or more tasks to the one or more resources. The output dashboard 404 may further display a resource workload matrix that comprises the current workload of the one or more resources after the allocation of the one or more tasks to the one or more resources.

Further, in an embodiment, the requestor may utilize the requestor-computing device 102 to view the information displayed at the output dashboard 404. Based on the displayed information, in case the requestor wishes to change the current allocation of the one or more tasks to the one or more resources, the requestor may update or amend the threshold values associated with the one or more SLAs (e.g., a baseline time, quality, or efficiency) and the one or more resources parameters (e.g., workload, utilization, or productivity). Based on the update or amended threshold values, the one or more previous pre-defined constraints are updated to obtain the one or more updated pre-defined constraints (denoted by 406) that are received and stored in the memory 206 by the processor 202. The processor 202, in conjunction with the task allocating processor 216, may update the allocation based on at least the one or more updated pre-defined constraints (denoted by 406).

After the allocation of the one or more tasks is finalized by the requestor, the respective allocations (denoted by 408) may be deployed at or transmitted to the one or more resource-computing devices (not shown) of the one or more resources by the processor 202. The one or more resources may utilize their corresponding resource-computing devices to process the one or more allocated tasks. In an embodiment, the processor 202 may be configured to monitor the real-time performance (denoted by 408) of the one or more resources, while the one or more resources are processing the one or more allocated tasks on their corresponding resource-computing devices. The processor 202 may monitor the real-time performance (denoted by 408) of the one or more resources based on various performance attributes that are tracked or captured, while the one or more resources are processing the one or more allocated tasks on their corresponding resource-computing devices. For example, the various performance attributes may comprise one or more of, but are not limited to, a count of tasks processed by a resource, a total time taken by the resource to process the count of tasks, a quality of task deliverables, and a count of baseline violations. Further, in an embodiment, the processor 202 may transmit the monitored real-time performance (denoted by 410) to the optimizing processor 216B. Based on the monitored real-time performance (denoted by 410), the optimizing processor 216B may re-allocate the one or more tasks to the one or more resources, such that the one or more pre-defined constraints are satisfied.

The disclosed embodiments encompass numerous advantages. The disclosure provides a method and a system for allocating tasks to employees in organizations. The disclosed method is based on an integer linear programming formulation. The disclosed method allocates the tasks to the employees considering a variety of factors such as the skills required to perform the tasks and skills possessed by the employees, such that one or more pre-defined constraints are satisfied. For example, the disclosed method ensures a fairness in terms of workload assigned to each employee. The disclosed method further ensures that the SLAs that are set in terms of a number and magnitude of baseline violations are met. The disclosed method further ensures that the employee's time is utilized efficiently by making sure that the utilization of every employee is within a defined range. The disclosed method further considers the productivity of the employees, making sure that no employee gets an unfair advantage to be extremely over productive compared to others. The disclosed method further performs regular dynamic re-allocation of the tasks to the employees based on their real-time performance. Hence, the disclosed method make sure a better team composition and workload for better day-to-day capacity planning.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit, and the internet. The computer further comprises a microprocessor. The microprocessor is connected to a communication bus. The computer also includes a memory. The memory may be RAM or ROM. The computer system further comprises a storage device, which may be a HDD or a removable storage drive such as a floppy-disk drive, an optical-disk drive, and the like. The storage device may also be a means for loading computer programs or other instructions onto the computer system. The computer system also includes a communication unit. The communication unit allows the computer to connect to other databases and the internet through an input/output (I/O) interface, allowing the transfer as well as reception of data from other sources. The communication unit may include a modem, an Ethernet card, or other similar devices that enable the computer system to connect to databases and networks, such as, LAN, MAN, WAN, and the internet. The computer system facilitates input from a user through input devices accessible to the system through the I/O interface.

To process input data, the computer system executes a set of instructions stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or only hardware, or using a varying combination of the two techniques. The disclosure is independent of the programming language and the operating system used in the computers. The instructions for the disclosure can be written in all programming languages, including, but not limited to, 'C', 'C++', 'Visual C++' and 'Visual Basic'. Further, software may be in the form of a collection of separate programs, a program module containing a larger program, or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms, including, but not limited to, 'Unix', DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems for auto-allocation of tasks to resources, by a computing server, associated with an organization. However, it should be apparent to those skilled in the art that modifications in addition to those described are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or used, or combined with other elements, components, or steps that are not expressly referenced.

A person with ordinary skill in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like.

The claims can encompass embodiments for hardware and software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method for operating an automatic task allocation system, the method comprising:
   receiving, by a transceiver of an application server, a request, pertaining to an allocation of a task to a resource, from a computing device over a communication network, wherein:
   the request comprises a first attribute of the task and predefined constraints associated with the allocation of the task,
   the first attribute comprises a skill required to process the task associated with a service level agreement (SLA),
   the predefined constraints are based on the SLA, a workload of the resource, a utilization of the resource, and a productivity of the resource, and
   the task comprises one or more of digitizing a document, writing code, extracting data, translating text, and analyzing data;
   extracting, by one or more processors of the application server, using computer program code, a second attribute from a database server over the communication network based on the first attribute, wherein the second attribute comprises a current skill of the resource;
   automatically determining, by the one or more processors, using the computer program code, the computer program code comprising an integer linear program, the allocation based on the first and second attributes and a comparison of the required skill with the current skill, such that the predefined constraints are satisfied in accordance with the integer linear program using a logarithmic function based on a count of one or more of resources comprising the resource, a count of the one or more tasks comprising the task, a first index for referring to the one or more resources, and a second index for referring to the one or more tasks;
   generating, by the one or more processors, using the computer program code, an allocation report based on the determined allocation;
   transmitting, by the transceiver, the allocation report to the computing device over the communication network;
   receiving, by the transceiver, an updated predefined constraint established based on the allocation report;
   monitoring, by the one or more processors, real-time performance of the task by the resource, wherein the real-time performance comprises a count of tasks processed by each resource, a time taken by each resource to process the count of tasks, and a count of baseline violations;
   automatically reallocating, by the one or more processors, using the integer linear program, the task to another resource based on the real-time performance monitoring and the updated predefined constraint such that the integer linear program optimally reallocates the task to satisfy the updated predefined constraint;
   generating, by the one or more processors, using the computer program code, an updated allocation report based on the reallocation of the task; and
   transmitting, by the transceiver, the updated allocation report to the computing device over the communication network.

2. The method of claim 1, wherein the SLA comprises one or more of a baseline time, a baseline cost, a baseline efficiency, and a baseline quality, each being associated the task.

3. The method of claim 1, wherein the second attribute further comprises a historical performance and a current allocation of the resource.

4. The method of claim 1, wherein the determination is further based on an upper threshold on a count of tasks that can exceed an associated baseline time.

5. The method of claim 1, wherein the predefined constraints further comprise a first predefined constraint that corresponds to a range of the workload, wherein the range of the workload is based on at least an average workload.

6. The method of claim 1, wherein the determination is further based on a second predefined constraint that corresponds to a range of utilization threshold values associated with the utilization of the resource.

7. The method of claim 1, wherein the allocation report is further generated based on a count of baseline time that will be potentially violated, a minimum and maximum workload of the resource, and a minimum and maximum productivity of the resource.

8. The method of claim 1, further comprising displaying one or both of the allocation report and the updated allocation report on the computing device.

9. An automatic task allocation system comprising an application server, the application server comprising a transceiver and one or more processors, wherein:
   the transceiver is configured to:
   receive a request, pertaining to an allocation of a task to a resource, from a computing device over a communication network, wherein:

the request comprises a first attribute of the task and predefined constraints associated with the allocation of the task, the first attribute comprises a skill required to process the task associated with a service level agreement (SLA), and the predefined constraints are based on the SLA, a workload of the resource, a utilization of the resource, and a productivity of the resource, and the task comprises one or more of digitizing a document, writing code, extracting data, translating text, and analyzing data;

transmit an allocation report to the computing device over the communication network;

receive an updated predefined constraint established based on the allocation report; and transmit an updated allocation report to the computing device over the communication network; and the one or more processors are configured to:

extract, using computer program code, a second attribute from a database server over the communication network based on the first attribute, wherein the second attribute comprises a current skill of the resource;

automatically determine, using the computer program code, the computer program code comprising an integer linear program, the allocation based on the first and second attributes, such that the predefined constraints are satisfied in accordance with the integer linear program using a logarithmic function based on a count of one or more of resources comprising the resource, a count of the one or more tasks comprising the task, a first index for referring to the one or more resources, and a second index for referring to the one or more tasks;

generate, using the computer program code, the allocation report based on the determined allocation;

monitor real-time performance of the task by the resource, wherein the real-time performance comprises a count of tasks processed by each resource, a time taken by each resource to process the count of tasks, and a count of baseline violations;

automatically reallocate, using the integer linear program, the task to another resource based on the real-time performance monitoring and the updated predefined constraint such that the integer linear program optimally reallocates the task to satisfy the updated predefined constraint; and generate the updated allocation report based on the reallocation of the task.

10. The system of claim 9, wherein the determination is further based on an upper threshold on a count of tasks that can exceed an associated baseline time.

11. The system of claim 9, wherein the predefined constraints further comprise a first predefined constraint that corresponds to a range of the workload, wherein the range of the workload is based on at least an average workload.

12. The system of claim 9, wherein the determination is further based on a second predefined constraint that corresponds to a range of utilization threshold values associated with the utilization of the resource.

13. The system of claim 9, wherein a document processor is further configured to generate the allocation report based on a count of baseline time that will be potentially violated, a minimum and maximum workload of the resource, and a minimum and maximum productivity of the resource.

14. The system of claim 9, further comprising the computing device, the computing device configured to display one or both of the allocation report and the updated allocation report on the computing device.

15. A computer program product comprising a non-transitory computer readable medium, wherein the non-transitory computer readable medium stores a computer program code for operating an automatic task allocation system, wherein the computer program code is executable by one or more processors of an application server of the system to:

receive, by a transceiver of the application server, a request, pertaining to an allocation of a task to a resource, from a computing device over a communication network, wherein:

the request comprises a first attribute of the task and predefined constraints associated with the allocation of the task, the first attribute comprises a skill required to process the task associated with a service level agreement (SLA), the predefined constraints are based on the SLA, a workload of the resource, a utilization of the resource, and a productivity of the resource, and the task comprises one or more of digitizing a document, writing code, extracting data, translating text, and analyzing data;

extract, by the one or more processors of the application server, using the computer program code, a second attribute from a database server over the communication network based on the first attribute, wherein the second attribute comprises a current skill of the resource;

automatically determine, by the one or more processors, using the computer program code, the computer program code comprising an integer linear program, the allocation based on the first and second attributes, such that the predefined constraints are satisfied in accordance with the integer linear program using a logarithmic function based on a count of one or more of resources comprising the resource, a count of the one or more tasks comprising the task, a first index for referring to the one or more resources, and a second index for referring to the one or more tasks;

generate, by the one or more processors, using the computer program code, an allocation report based on the determined allocation;

transmit, by the transceiver, the allocation report to the computing device over the communication network;

receive, by the transceiver, an updated predefined constraint established based on the allocation report;

monitor, by the one or more processors, real-time performance of the task by the resource, wherein the real-time performance comprises a count of tasks processed by each resource, a time taken by each resource to process the count of tasks, and a count of baseline violations;

automatically reallocate, by the one or more processors, using the integer linear program, the task to another resource based on the real-time performance monitoring and the updated predefined constraint such that the integer linear program optimally reallocates the task to satisfy the updated predefined constraint;

generate, by the one or more processors, using the computer program code, an updated allocation report based on the reallocation of the task and generate an updated allocation report; and transmit the updated allocation report to the computing device.

* * * * *